US012724433B2

(12) United States Patent
Holbrook et al.

(10) Patent No.: US 12,724,433 B2
(45) Date of Patent: Sep. 1, 2026

(54) FLOW CONTROL ARRANGEMENTS WITH BYPASS SWITCHES, SEMICONDUCTOR PROCESSING SYSTEMS, AND RELATED FLOW CONTROL METHODS

(71) Applicant: ASM IP Holding, B.V., Almere (NL)

(72) Inventors: Glenn Holbrook, Scottsdale, AZ (US); Mark Fessler, Phoenix, AZ (US)

(73) Assignee: ASM IP Holding B.V., Almere (NL)

( * ) Notice: Subject to any disclaimer, the term of this patent is extended or adjusted under 35 U.S.C. 154(b) by 530 days.

(21) Appl. No.: 18/351,295

(22) Filed: Jul. 12, 2023

(65) Prior Publication Data

US 2024/0019880 A1 Jan. 18, 2024

Related U.S. Application Data

(60) Provisional application No. 63/389,797, filed on Jul. 15, 2022.

(51) Int. Cl.
*G05D 7/06* (2006.01)
*G05B 19/05* (2006.01)

(52) U.S. Cl.
CPC ......... *G05D 7/0688* (2013.01); *G05B 19/054* (2013.01); *G05B 19/058* (2013.01)

(58) Field of Classification Search
CPC .. G05D 7/0688; G05D 7/0647; G05D 7/0635; G05B 19/054; G05B 19/058; H10P 72/0402
See application file for complete search history.

(56) References Cited

U.S. PATENT DOCUMENTS 3,843,056 A * 10/1974 Nye ........................ A01G 25/16 239/70
4,589,435 A * 5/1986 Aldrich ................... F16K 21/16 137/625.22
5,019,678 A 5/1991 Templeton
6,006,398 A * 12/1999 Larson ...................... B08B 3/00 137/341
9,938,698 B2 * 4/2018 Guy .................... G01M 3/2807
(Continued)

OTHER PUBLICATIONS

Flow Switch Bypass Switch (FSBS) Technical Specification Sheet, Potter Electric Signal Co., LLC, St. Louis, MO, 5401554—Rev A, Oct. 2018, 2 pages.

*Primary Examiner* — Patrick C Williams
(74) *Attorney, Agent, or Firm* — Banner & Witcoff, Ltd.

(57) ABSTRACT

A flow control arrangement includes a housing seating inlet and outlet conduits, an isolation valve arranged within the housing and is connected to the inlet conduit, a flow switch, and a bypass switch. The flow switch has a shutoff trigger, is arranged within the housing, and couples the isolation valve to the outlet conduit. The bypass switch is coupled to the isolation valve and has first and second positions. The flow switch is operably coupled to the isolation valve when the bypass switch is in the first position to close the isolation valve when flow rate of fluid traversing the flow switch rises above the shutoff trigger, and is operably decoupled from the isolation valve when the bypass switch is in the second position to flow fluid through the flow switch at flow rates greater than the shutoff trigger. Semiconductor processing systems and related flow control methods are also described.

20 Claims, 8 Drawing Sheets

(56) References Cited

U.S. PATENT DOCUMENTS

| | | | | |
|---|---|---|---|---|
| 2004/0002224 | A1* | 1/2004 | Chono | H10P 72/0604<br>156/345.32 |
| 2011/0001070 | A1* | 1/2011 | Wilke | F16K 31/1262<br>251/129.03 |
| 2015/0380280 | A1* | 12/2015 | Amiya | G05D 11/138<br>137/613 |
| 2019/0243392 | A1* | 8/2019 | Ding | C23C 16/52 |

* cited by examiner

FLOW CONTROL ARRANGEMENTS WITH BYPASS SWITCHES, SEMICONDUCTOR PROCESSING SYSTEMS, AND RELATED FLOW CONTROL METHODS

CROSS-REFERENCE TO RELATED APPLICATION(S)

This application claims the benefit of U.S. Provisional Application 63/389,797 filed on Jul. 15, 2022, the entire contents of which are incorporated herein by reference.

FIELD OF INVENTION

The present disclosure generally relates to controlling fluid flows, and more particularly, to controlling the fluid flows containing hazardous materials.

BACKGROUND OF THE DISCLOSURE

Fluid systems are commonly used to convey fluids, such as process fluids, to semiconductor processing systems during fabrication of semiconductor devices. In some fluid systems, the fluid communicated by the system may contain a hazardous material. For example, fluid systems may communicate fluids containing materials know to be harmful to human health or the environment, are pyrophoric, and/or are corrosive. To limit such hazards, fluids systems commonly employ flow-limiting devices, like restrictors and orifice plates, as well as vent flows and inert/diluent flows to reduce risk associated with such hazardous materials.

While generally satisfactory for their intended purpose, flow-limiting devices can impose operational constraints on certain fluid systems and may be subject to plugging, potentially limiting reliability of the fluid systems. And vent flows and inert/diluent flows, while generally effective in limiting risk in the unlikely event of fluid system leakage and rendering exhaust flows inert (or less corrosive), increase operating costs. Moreover, as the flow rate of vent and inert/diluent flows are typically greater than actually required by the fluid destination during processing, the operating costs are generally greater than actually required by the fluid destination.

Such systems and methods have generally been considered suitable for their intended purpose. However, there remains a need in the art for improved flow control arrangements and related methods. The present disclosure provides a solution to this need.

SUMMARY OF THE DISCLOSURE

A flow control arrangement is provided. The flow control arrangement includes a housing seating an inlet conduit and an outlet conduit, an isolation valve, a flow switch, and a bypass switch. The isolation valve is arranged within the housing and is connected to the inlet conduit. The flow switch is arranged within the housing, couples the isolation valve to the outlet conduit, and has a shutoff trigger. The bypass switch has a first position and a second position, is coupled to led to the isolation valve, and operably couples the flow switch to the isolation valve when the bypass switch is in the first position to close the isolation valve when flow rate of a fluid through the flow switch is above the shutoff trigger, and operably decouples the flow switch from the isolation valve when the bypass switch is in the second position to flow a fluid through the flow switch at a flow rate greater than the shutoff trigger.

In addition to one or more of the features described above, or as an alternative, further examples of the flow control arrangement may include that a flow path defined between the inlet conduit and the outlet conduit is contiguously welded.

In addition to one or more of the features described above, or as an alternative, further examples of the flow control arrangement may include that the housing includes a tamperproof body enclosing the isolation valve, the flow switch, at least a portion of the inlet conduit, and at least a portion of the outlet conduit.

In addition to one or more of the features described above, or as an alternative, further examples may include an electrical connector seated in a wall of the housing, an internal signal harness arranged within the housing and electrically connected to the isolation valve and the flow switch, and an external signal harness arranged outside of the housing and electrically connected to the internal signal harness by the electrical connector.

In addition to one or more of the features described above, or as an alternative, further examples may include a solenoid arranged within the housing and operatively connected to the isolation valve, a relay arranged outside of the housing and electrically connected to the solenoid to energize the solenoid, and a safety programmable logic controller (PLC) device arranged outside of the housing and coupled to the relay, the safety PLC device communicative with a user interface to provide a user output based on open and closure of the relay.

In addition to one or more of the features described above, or as an alternative, further examples of the flow control arrangement may include a controller coupling the flow switch to the isolation valve.

In addition to one or more of the features described above, or as an alternative, further examples of the flow control arrangement may include that the controller is responsive to instructions recorded on a memory to receive bypass signal from the bypass switch indicating that the bypass switch is in the first position, receive a shutoff signal from the flow switch, and provide a closure signal to the isolation valve in response to receipt of the shutoff signal from the flow switch.

In addition to one or more of the features described above, or as an alternative, further examples of the flow control arrangement may include that the instructions recorded on the memory further cause the controller to receive bypass signal from the bypass switch indicating that the bypass switch is in the second position, receive a shutoff signal from the flow switch, and provide no closure signal to the isolation valve in response to receipt of the shutoff signal from the flow switch.

In addition to one or more of the features described above, or as an alternative, further examples of the flow control arrangement may include that the controller includes a safety programmable logic controller device, and that a bypass lead electrically connects the bypass switch to the controller.

In addition to one or more of the features described above, or as an alternative, further examples of the flow control arrangement may include a lockout-tagout device affixed to the bypass switch and fixing the bypass switch in the first position.

A semiconductor processing system is provided. The semiconductor processing system includes a process fluid source including a hazardous process material and a flow control arrangement as described above. The process fluid source is fluidly coupled to the inlet conduit, a flow control device with a flow rating is coupled to the outlet conduit, and a process chamber with a substrate support fluidly is coupled to the flow control device and therethrough to the process fluid source. The flow rating of the flow control device is less than the shutoff trigger of the flow switch.

In addition to one or more of the features described above, or as an alternative, further examples of the semiconductor processing system may include a qualification/service fluid source coupled to the process chamber by the flow control arrangement. The qualification/service fluid source includes a qualification/service fluid consisting essentially of nitrogen gas.

In addition to one or more of the features described above, or as an alternative, further examples of the semiconductor processing system may include a gas box housing the flow control device, a vent source, and an exhaust source. The vent source is fluidly coupled to the gas box, wherein the vent source is matched to the shutoff trigger of the flow switch, the vent source undersized relative to the flow rating of the flow control device. The exhaust source is fluidly coupled to the process chamber. The inert/diluent fluid source is fluidly coupled to the exhaust source, is matched to the shutoff trigger of the flow switch, and is undersized relative to the flow rating of the flow control device.

A flow control method is provided. The method includes, at a flow control arrangement as described above, moving the bypass switch to the first position or the second position, operably coupling the flow switch to the isolation valve when the bypass switch is in the first position, and operably decoupling the flow switch from the isolation valve when the bypass switch is in the second position. The isolation valve is closed when flow rate of a fluid traversing the flow switch is greater than the shutoff trigger while the bypass switch is in the first position, and the isolation valve remains open when flow rate of a fluid traversing the flow switch is less that the shutoff trigger while the bypass switch is in the second position.

In addition to one or more of the features described above, or as an alternative, further examples of the method may include that moving the bypass switch comprises moving the bypass switch to the first position. The method may further include receiving a process fluid including a hazardous material at the inlet conduit, flowing the process fluid to the outlet conduit through the isolation valve and the flow switch, and comparing flow rate of the process fluid to the shutoff trigger at the flow switch. A shutoff signal may be provided using the flow switch when the flow rate is greater than the shutoff trigger, and a closure signal may be received at the isolation valve responsive to provision of the shutoff signal by the flow switch.

In addition to one or more of the features described above, or as an alternative, further examples of the method may include that moving the bypass switch comprises moving the bypass switch to the first position. The method may further include receiving a process fluid including a hazardous material at the inlet conduit, flowing the process fluid to the outlet conduit through the isolation valve and the flow switch, and comparing flow rate of the process fluid to the shutoff trigger at the flow switch. No shutoff signal may be provided to the flow switch when the flow rate of the process fluid is less than the shutoff trigger of the flow switch.

In addition to one or more of the features described above, or as an alternative, further examples of the method may include that the bypass switch is in the first position, and the method may further include flowing the process fluid to a process chamber fluidly coupled to the outlet conduit by a flow control device having a flow rating, the flow rating being greater than the shutoff trigger of the flow switch.

In addition to one or more of the features described above, or as an alternative, further examples of the method may include moving the bypass switch to the second position, receiving a process fluid including a hazardous material at the inlet conduit, flowing the process fluid to the outlet conduit through the isolation valve and the flow switch, and comparing flow rate of the process fluid to the shutoff trigger at the flow switch. A shutoff signal may be provided with the flow switch when the flow rate of the process fluid is greater than the shutoff trigger of the flow switch, and a closure signal may be received at the isolation valve responsive to provision of the shutoff signal by the flow switch.

In addition to one or more of the features described above, or as an alternative, further examples of the method may include affixing a lockout-tagout device to the bypass switch and fixing the bypass switch in the second position with the lockout-tagout device.

In addition to one or more of the features described above, or as an alternative, further examples of the method may include moving the bypass switch to the second position, receiving a qualification/service fluid at the inlet conduit; and flowing the qualification/service fluid to the outlet conduit through the isolation valve and the flow switch. Flow rate of the qualification/service fluid may be compared to the shutoff trigger at the flow, no shutoff signal may be provided with the flow switch when the flow rate of the qualification/service fluid is less than the shutoff trigger of the flow switch, and the qualification/service may be flowed to a process chamber coupled to the outlet conduit at a flow rating of a flow control device coupling the outlet conduit to the process chamber.

This summary is provided to introduce a selection of concepts in a simplified form. These concepts are described in further detail in the detailed description of examples of the disclosure below. This summary is not intended to identify key features or essential features of the claimed subject matter, nor is it intended to be used to limit the scope of the claimed subject matter.

BRIEF DESCRIPTION OF THE DRAWING FIGURES

These and other features, aspects, and advantages of the invention disclosed herein are described below with reference to the drawings of certain embodiments, which are intended to illustrate and not to limit the invention.

Figure 1:
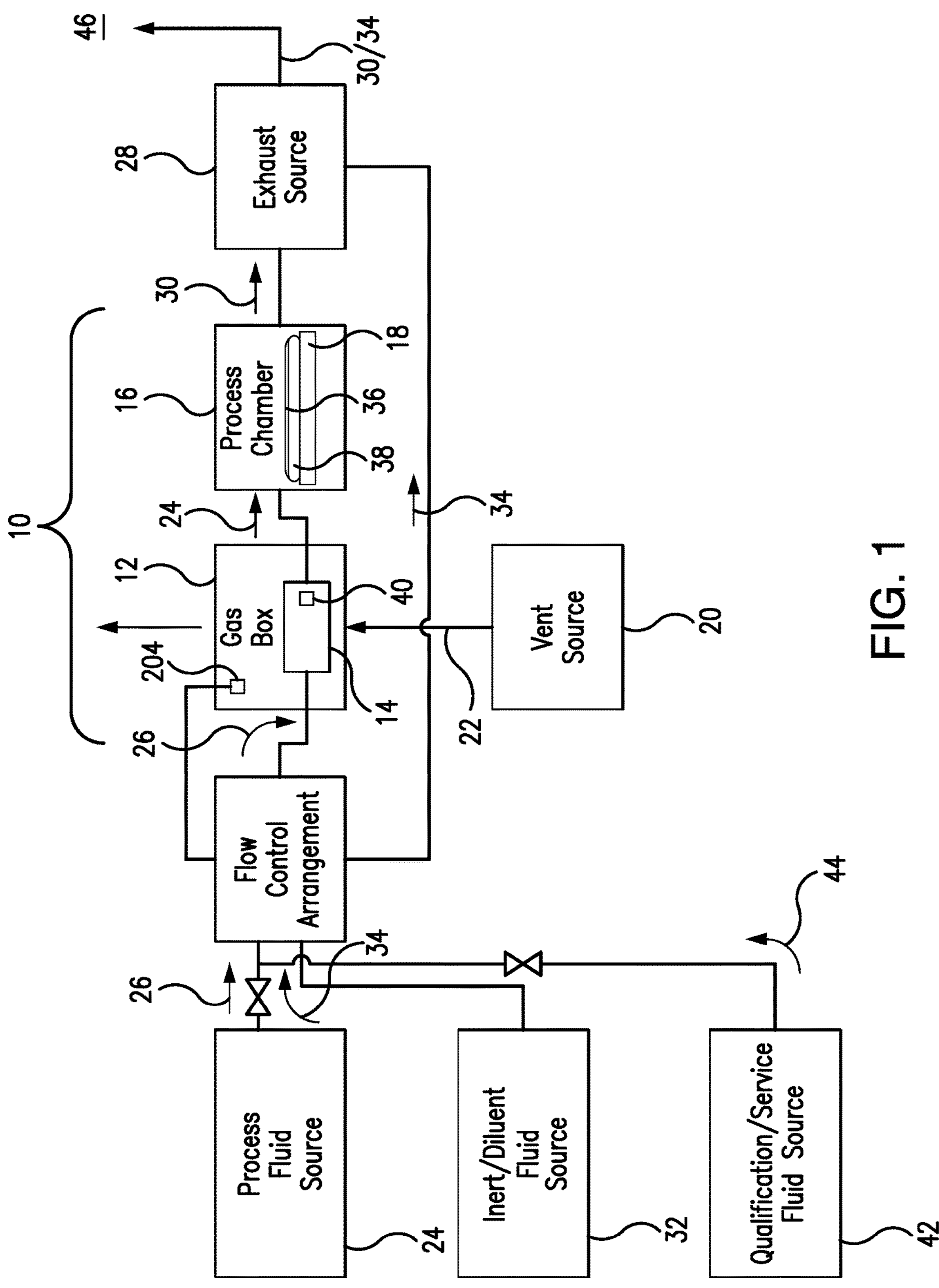
FIG. 1 is a schematic view of a flow control arrangement in accordance with the present disclosure, showing the flow control arrangement coupling a process fluid source and a qualification/service fluid source to a semiconductor processing system.
Figure 5:
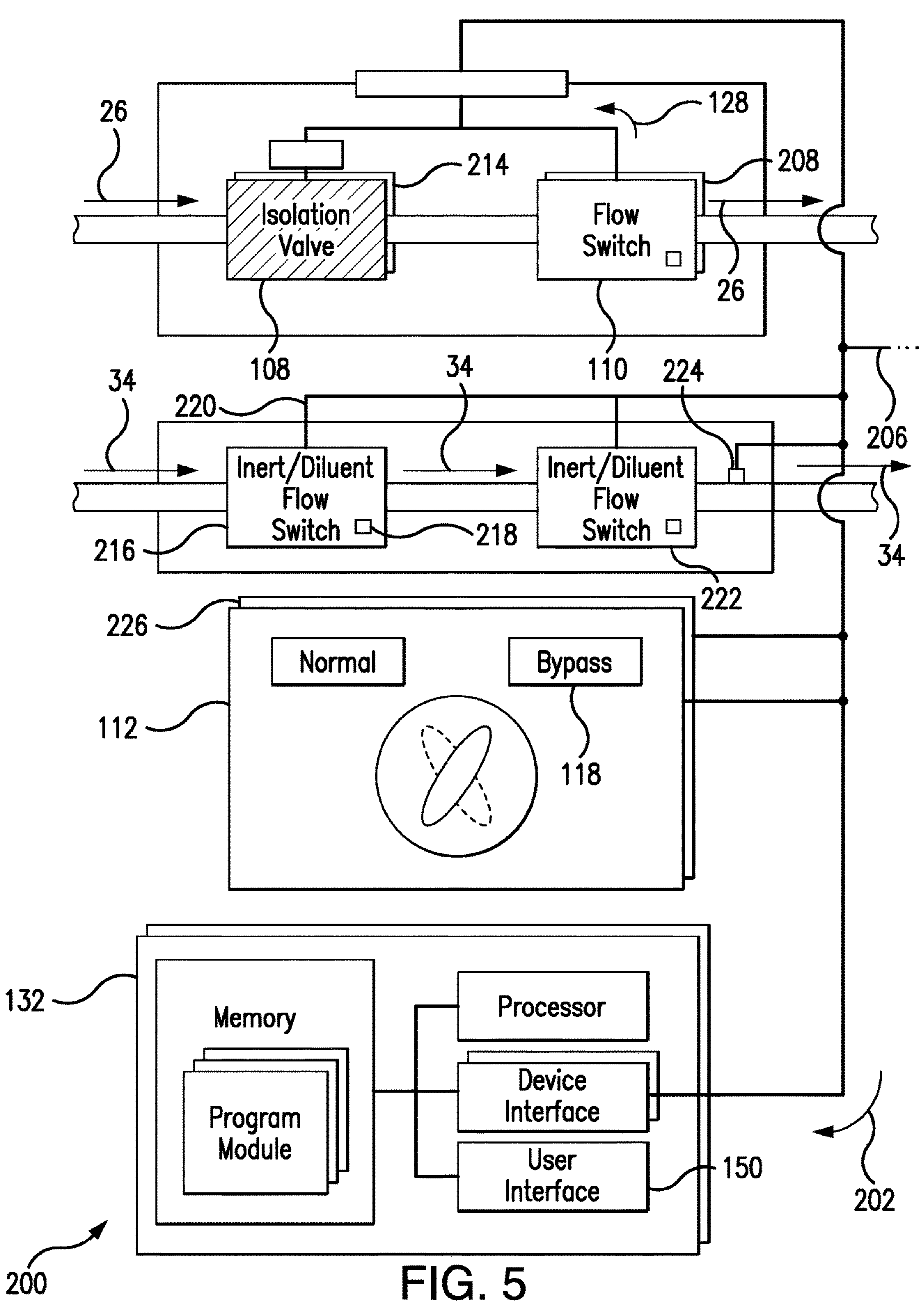
Figure 6:
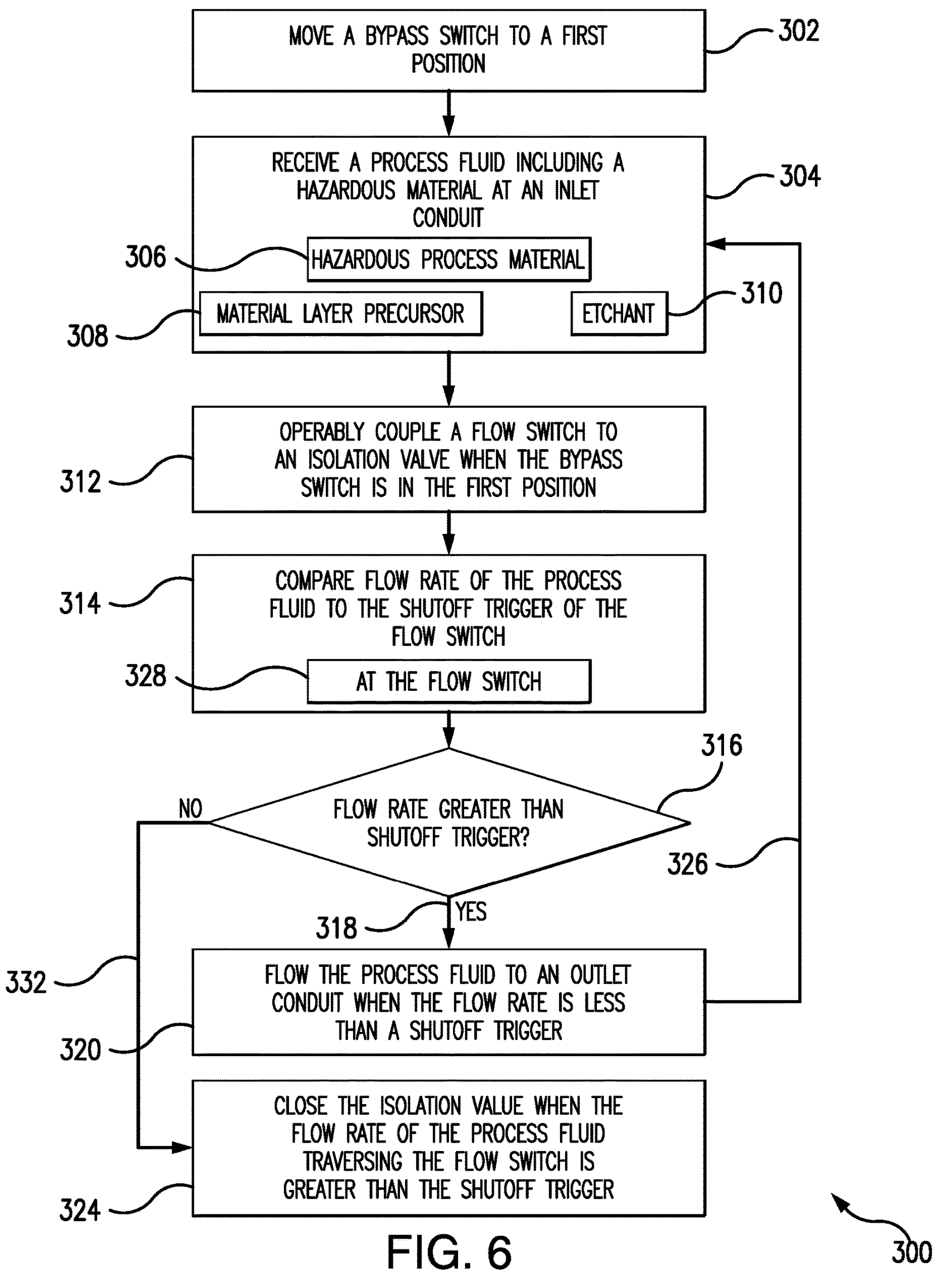

FIG. 5 is a schematic view of the flow control arrangement of FIG. 1 according to another example of the present disclosure, showing diagnostic inputs for determining reliability of the flow control arrangement according to the example; and FIGS. 6-9 are a block diagram of a flow control method according to an example of the present disclosure, showing operations of the method according to an illustrative and non-limiting example of the method.

It will be appreciated that elements in the figures are illustrated for simplicity and clarity and have not necessarily been drawn to scale. For example, the relative size of some of the elements in the figures may be exaggerated relative to other elements to help improve understanding of illustrated embodiments of the present disclosure.

DETAILED DESCRIPTION OF EXEMPLARY EMBODIMENTS

Reference will now be made to the drawings wherein like reference numerals identify similar structural features or aspects of the subject disclosure. For purposes of explanation and illustration, and not limitation, a partial view of an example of a flow control arrangement in accordance with the present disclosure is shown in FIG. 1 and is designated generally by reference character 100. Other examples of flow control arrangements, semiconductor processing systems, and fluid control methods in accordance with the present disclosure, or aspects thereof, are provided in FIGS. 2-9, as will be described. The flow control arrangements and flow control methods described herein may be used to control fluid flows containing hazardous materials, such as to control fluid flows containing hazardous process materials employed to deposit material layers onto substrates during the fabrication of semiconductor devices, though the present disclosure is not limited to any particular semiconductor device fabrication operation or to semiconductor device fabrication in genera.

As used herein, the term “substrate” may refer to any underlying material or materials that may be used, or upon which, a device, a circuit, or a film may be formed. The “substrate” may be continuous or non-continuous; rigid or flexible; solid or porous. The substrate may be in any form such as a powder, a plate, or a workpiece. Substrates in the form of a plate may include wafers in various shapes and sizes. Substrates may be made from materials including silicon, silicon germanium, silicon oxide, gallium arsenide, gallium nitride, and silicon carbide by way of example and not for limitation.

As used herein, the term “hazardous process material” refers to a solid, liquid, or gas associated with semiconductor device fabrication that has a degree-or-hazard rating of 3 or 4 in health, flammability, instability, or water reactivity in accordance with NFPA 704 (“Standard System for the Identification of the Hazards of Materials for Emergency” 2022 Edition). Hazardous process materials may be used directly in research, laboratory, or production processes associated with semiconductor device fabrication. Hazardous process materials may be an effluent generated in connection with research, laboratory, or production processes associated with semiconductor device fabrication. Hazardous process materials may be associated with the fabrication of a semiconductor device which, as an end product, is not itself hazardous.

With reference to FIG. 1, a semiconductor processing system 10 is shown. The semiconductor processing system 10 includes a gas box 12 with a flow control device 14 and process chamber 16 with a substrate support 18. The gas box 12 is connected to a vent source 20 and is configured to receive a vent fluid 22 from the vent source 20 to ventilate an interior of the gas box 12. The flow control device 14 is arranged within the interior of the gas box 12, is connected to a process fluid source 24 by the flow control arrangement 100, and is configured to provide to flow a process fluid 26 received from the process fluid source 24 to the process chamber 16. The process chamber 16 is connected to an exhaust source 28 (e.g., a vacuum pump) and is configured to communicate an exhaust fluid 30 (e.g., residual precursor and/or reaction products) to the exhaust source 28. The exhaust source 28 is further connected to an inert/diluent fluid source 32 by the flow control arrangement 100 and is configured to introduce an inert/diluent fluid 34 received from the inert/diluent fluid source 32 into the exhaust fluid 30. In the illustrated example the semiconductor processing system 10 is configured to deposit material layers onto substrates, e.g., a material layer 36 onto a substrate 38, supported within the process chamber 16. Although shown and described herein in the context of a semiconductor processing system employed for material layer deposition, it is to be understood and appreciated that other types of semiconductor processing systems, and fluid systems generally, can also benefit from the present disclosure.

In certain examples, the process fluid 26 may include a hazardous material. In accordance with certain examples, the process fluid 26 may include a hazardous process material (HPM). The process fluid 26 may include hydrogen ($H_2$) gas, a silicon-containing precursor like silane ($SiH_4$), or an arsenic-containing precursor such as arsine ($AsH_3$). The inert/diluent fluid 34 may include an inert gas or a diluent fluid. For example, the inert/diluent fluid 34 may include nitrogen ($N_2$) gas (e.g., high-purity nitrogen), argon (Ar) gas, helium (He) gas, or a mixture including one or more of the aforementioned gases.

In certain examples, the flow control device 14 may include a flow-limiting device such as a metering valve and/or a restrictor or orifice plate, which defines a flow rating 40 of the flow control device 14. In accordance with certain examples, a qualification/service fluid source 42 may be in selective fluid communication with the semiconductor processing system 10 through the flow control arrangement 100 to provide a qualification/service fluid 44 to the semiconductor processing system 10. The qualification/service fluid 44 may include an inert fluid. Examples of suitable inert fluids include nitrogen ($N_2$) gas, argon (Ar) gas, krypton (Kr) gas, helium (He) gas, and mixtures including such inert fluids.

As has been explained above, it can sometimes be necessary to provide a qualification/service fluid to a semiconductor processing system at a flow rates greater than that required during processing. As has also been explained above, it can also be desirable to limit flow rate of vent fluid and/or inert/diluent fluid provided to a semiconductor processing system to limit (or eliminate) risk associated with hazardous material contained within a process fluid provided to the semiconductor processing system. To provide a qualification/service fluid at flow rates greater than that required during processing, and/or to limit the flow rate of vent fluids and/or inert/diluent fluids required during processing, the flow control arrangement 100 is provided.

Figure 2:
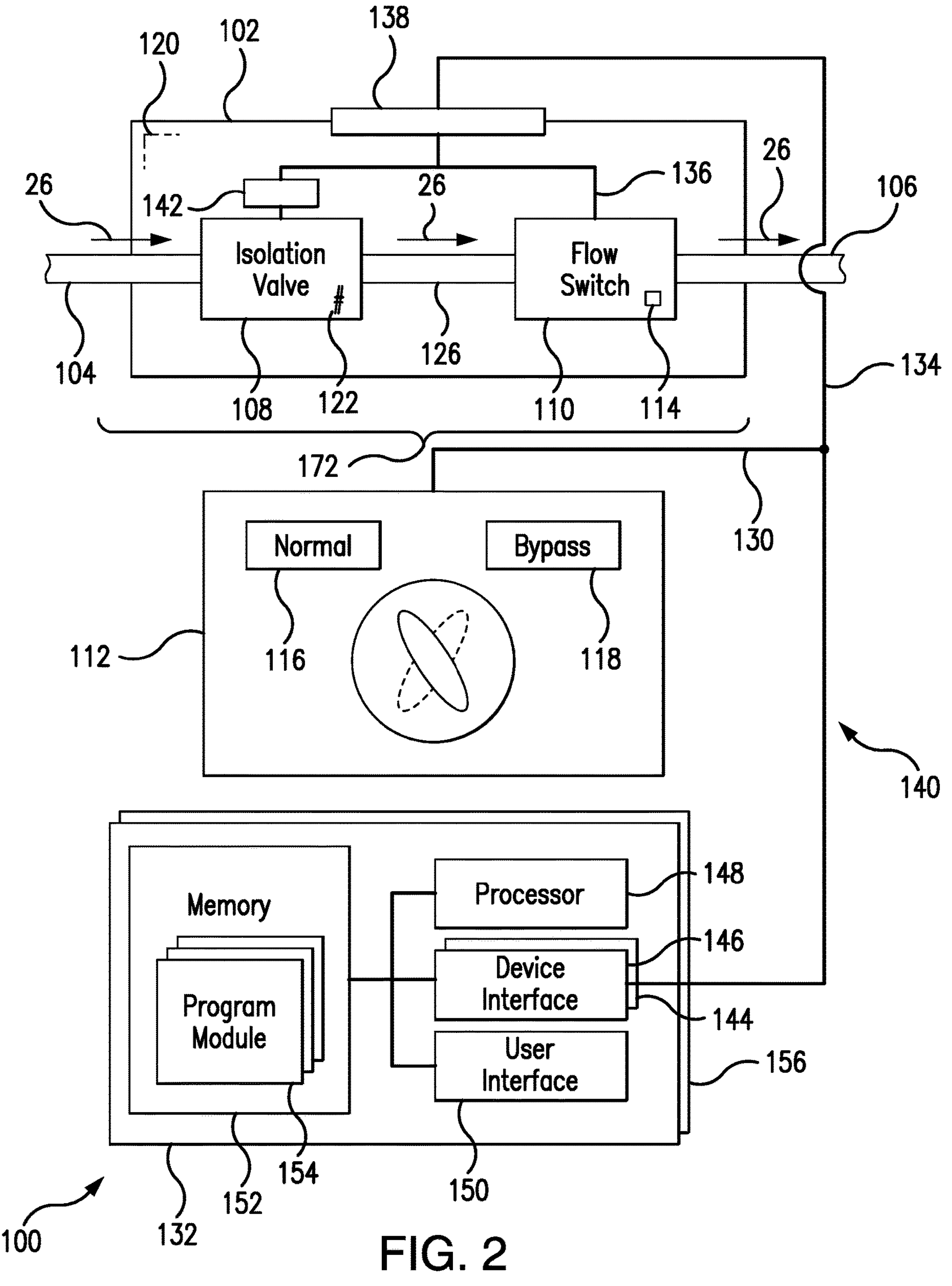
FIG. 2 is a schematic view of the flow control arrangement of FIG. 1 according to an example of the present disclosure, showing a bypass switch for operatively coupling and operatively decoupling a flow switch from an isolation valve in the flow control arrangement.
Figure 3:
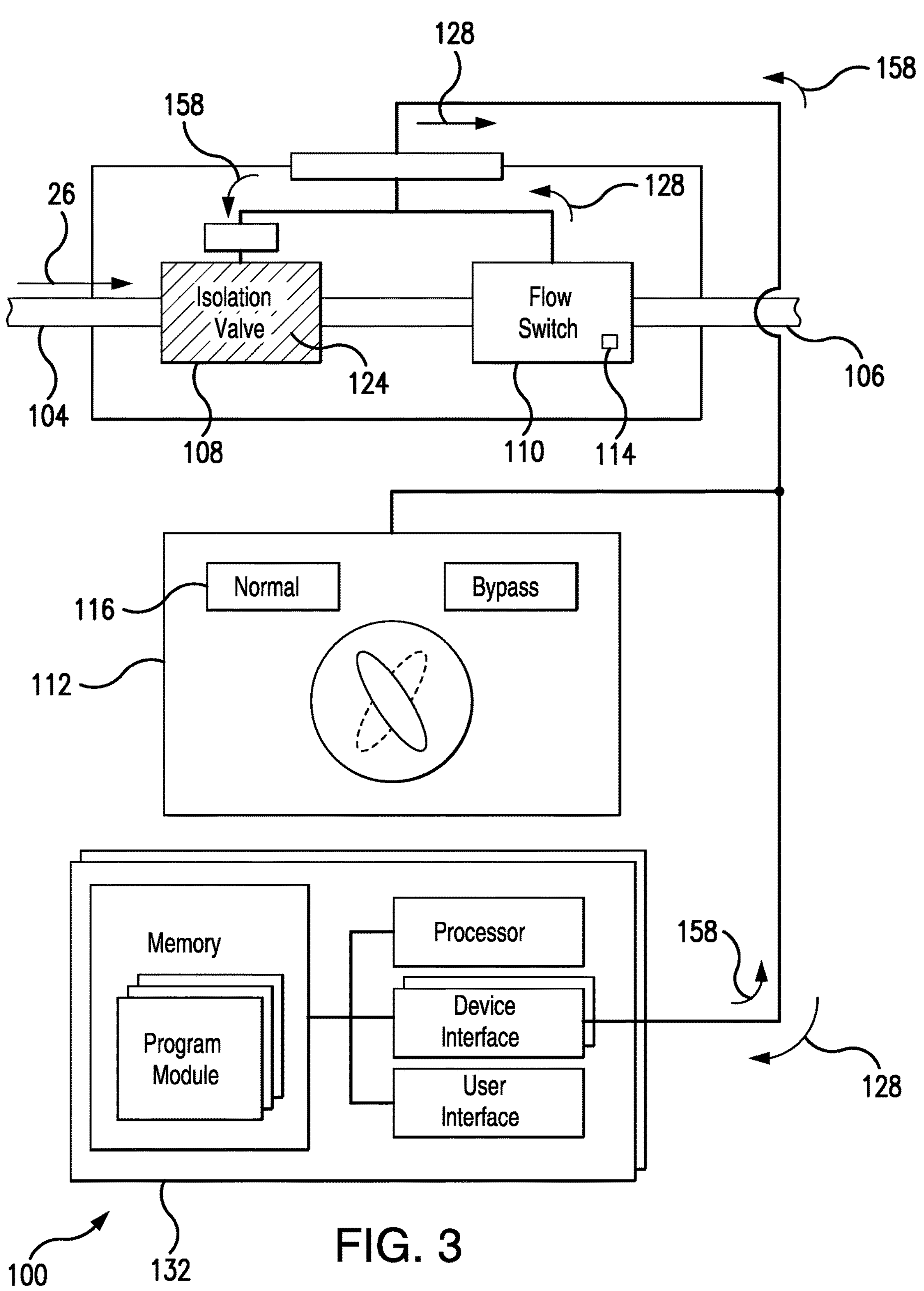
FIGS. 3 and 4 are schematic views of the flow control arrangement of FIG. 1 according to the example, showing the bypass switch in a first position to operatively couple the flow switch to the isolation valve selective communication of process fluid therethrough.
Figure 4:
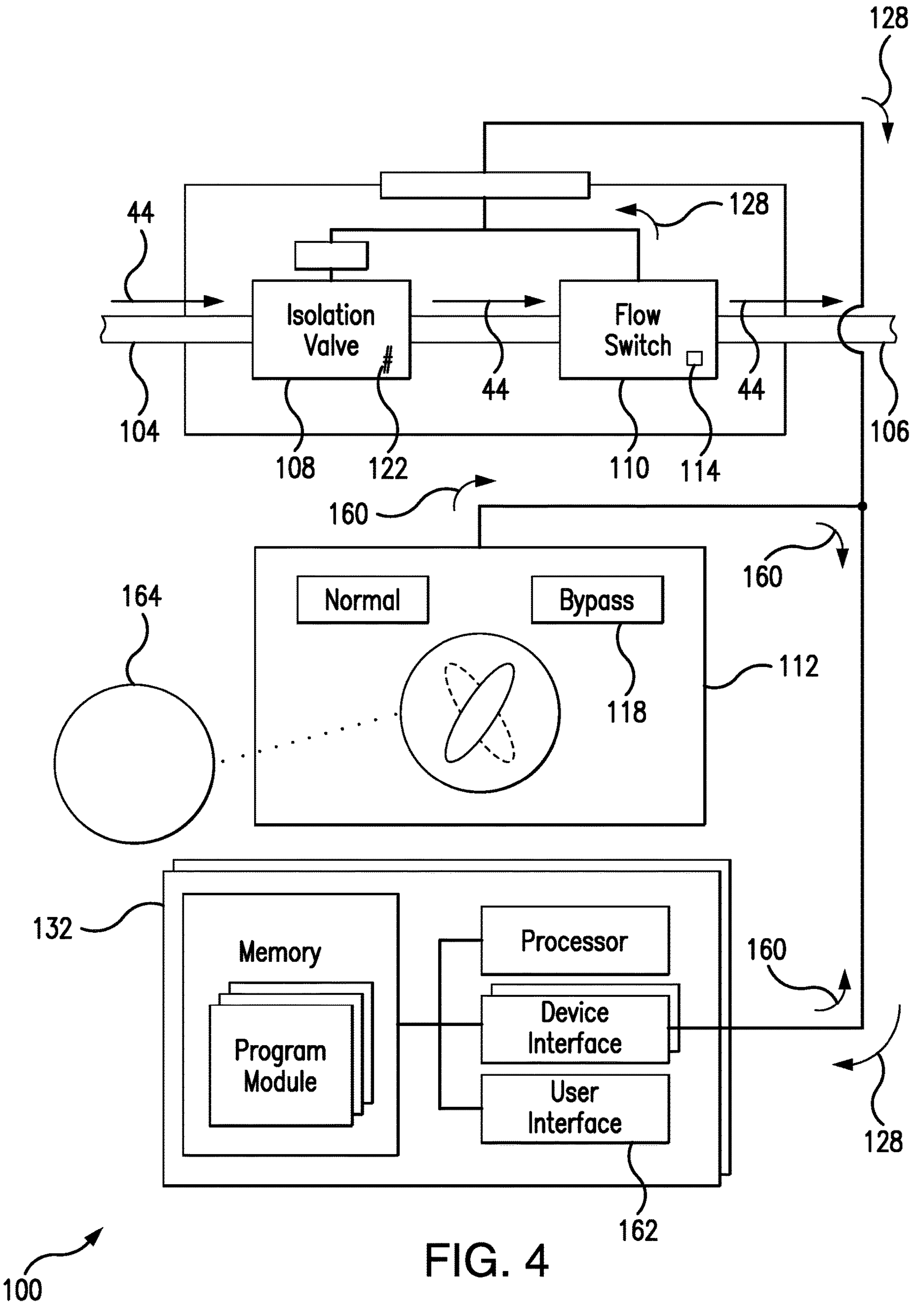

Referring to FIGS. 2-4, the flow control arrangement 100 is shown. As shown in FIG. 2 the flow control arrangement incudes a housing 102 seating an inlet conduit 104 and an outlet conduit 106, an isolation valve 108, a flow switch 110, and a bypass switch 112. The isolation valve 108 is arranged within the housing 102 and is connected to the inlet conduit 104. The flow switch 110 is arranged within the housing 102, connects the isolation valve 108, and has a shutoff trigger 114. The bypass switch 112 is coupled to the isolation valve 108 and has a first position 116, wherein the flow switch 110 is operably coupled to the isolation valve 108 to close the isolation valve when flow rate of the process fluid 26 rises above the shutoff trigger 114, and a second position 118, wherein the flow switch 110 is operably decoupled from the isolation valve 108 to flow the qualification/service fluid 44 (shown in FIG. 1) to the outlet conduit 106 at a flow rate greater than the shutoff trigger 114.

In certain examples, the housing 102 may include a tamperproof body 120. The tamperproof body 120 may enclose at least a portion of the inlet conduit 104, at least a portion of the outlet conduit 106, the isolation valve 108, and the flow switch 110. In accordance with certain examples, the housing 102 may be formed from a metallic material, such as aluminum or stainless steel. The metallic material may enclose both the isolation valve 108 and the flow switch 110. In accordance with certain examples, the housing 102 may include be formed as a weldment. The weldment may enclosure both the isolation valve 108 and the flow switch 110.

In certain examples, the inlet conduit 104 may be in selective fluid communication with the process fluid source 24 (shown in FIG. 1), such as through a process fluid source valve. In accordance with certain examples, the inlet conduit 104 may be in selective fluid communication with the qualification/service fluid source 42 (shown in FIG. 1), and may further extend from outside the housing 102 and into the interior of the housing 102 to connect to the isolation valve 108. It is contemplated that outlet conduit 106 be fluidly coupled to the semiconductor processing system 10 (shown in FIG. 1), and that the outlet conduit 106 be in selective fluid communication with the inlet conduit 104 through flow switch 110 and the isolation valve 108. The outlet conduit 106 may extend from outside of the housing 102 and into the interior of the housing 102 to connect to the flow switch 110.

The isolation valve 108 is arranged within the housing 102, is connected to the inlet conduit 104, and couples the inlet conduit 104 to the flow switch 110. The isolation valve 108 further has an open position 122 and a closed position 124 (shown in FIG. 3). When in the open position 122 the isolation valve 108 fluidly couples the inlet conduit 104 to the flow switch 110, the outlet conduit 106 thereby in fluid communication with the inlet conduit 104. When in the closed position 124 the isolation valve 108 fluidly separates the flow switch 110 from the inlet conduit 104, the outlet conduit 106 thereby fluidly separated from the inlet conduit 104. In certain examples, the isolation valve 108 may connected to either (or both) the inlet conduit 104 and the flow switch 110 by a welded joint. In accordance with certain examples, the isolation valve 108 may be connected to either (or both) the inlet conduit 104 and the flow switch 110 by a union or a threaded fitting. It is also contemplated that isolation valve 108 may be coupled to the flow switch 110 by an interconnect conduit 126. Examples of suitable isolation valves include D211 G1/8 DN2.0 isolation valves, available from Jaksa d.o.o. of Ljubljana, Slovenia.

The flow switch 110 is arranged within the housing 102, is connected to the isolation valve 108, and couples the isolation valve 108 to the outlet conduit 106. The flow switch 110 is further configured to compare flow rate of fluid traversing the flow switch 110 to the shutoff trigger 114 and provide a shutoff signal 128 (shown in FIG. 3) when flow rate of the fluid is greater than the shutoff trigger 114. For example, the flow switch 110 may provide the shutoff signal 128 when flow rate of the process fluid 26 is greater than the shutoff trigger 114, for example, when the process fluid source 24 (shown in FIG. 1) is connected to the flow control arrangement 100 and therethrough to the semiconductor processing system 10 (shown in FIG. 1). The flow switch 110 may further provide the shutoff signal 128 when flow rate of the qualification/service fluid 44 (shown in FIG. 4) traversing the flow switch 110 is greater than the shutoff trigger 114, for example, when the qualification/service fluid source 42 is connected to the flow control arrangement 100 and fluidly coupled therethrough to the semiconductor processing system 10. Examples of suitable flow switches include FS10A flow switches, available from Fluid Components International LLC of San Marcos, California.

In certain examples, the shutoff trigger 114 may be less than the flow rating 40 (shown in FIG. 1) of the flow control device 14 (shown in FIG. 1). As will be appreciated by those of skill in the art in view of the present disclosure, examples where the shutoff trigger 114 is less than the flow rating 40 of the flow control device 14 allows flow rate of the vent fluid 22 (shown in FIG. 1) and/or the inert/diluent fluid 34 (shown in FIG. 1) to be smaller than otherwise required by the flow rating 40, limiting operating cost of the semiconductor processing system 10. In this respect the flow rate of the vent fluid 22 may be undersized relative to the flow rating 40 of the flow control device 14, the flow rate of the vent fluid 22 insufficient to render the process fluid 26 safe were the process fluid 26 (shown in FIG. 1) flowed at the flow rating 40 of the flow control device 14 to the process chamber 16 (shown in FIG. 1). In further respect the flow rate of the inert/diluent fluid 34 (shown in FIG. 1) may be undersized relative to the flow rating 40 of the flow control device 14, the flow rate of the inert/diluent fluid 34 insufficient to render the exhaust fluid 30 (shown in FIG. 1) were the process fluid 26 flowed to the process chamber 16 at the flow rating of the flow control device 14.

In certain examples, the shutoff trigger 114 may be between about 20% and about 80% of the flow rating 40, or between about 30% and about 70% of the flow rating 40, or even between about 40% and about 60% of the flow rating 40. In accordance with certain examples, that the shutoff trigger 114 may be substantially equivalent to (or greater than) the flow rating 40. It is also contemplated that the shutoff trigger 114 may be greater than the flow rating 40 and remain within the scope of the present disclosure. It is also contemplated that inlet conduit 104, the isolation valve 108, the interconnect conduit 126, flow switch 110, and the outlet conduit 106 may define a flow path 172. The flow path 172 may be contiguously welded.

The bypass switch 112 is coupled to the isolation valve 108. The bypass switch 112 is further coupled to the flow switch 110 and is configured to operably couple and operably decouple the flow switch 110 from the isolation valve 108. In this respect, it is contemplated that the bypass switch 112 operably couple the flow switch 110 to the isolation valve 108 when in the first position 116, the flow switch 110 thereby closing the isolation valve 108 when flow rate of fluid traversing the flow switch 110 is greater than and/or rises above the shutoff trigger 114. In further respect, it is further contemplated that the bypass switch 112 operably decouples the flow switch 110 from the isolation valve 108 When in the second position 118, the isolation valve 108 thereby remaining open when flow rate of fluid traversing the flow switch 110 is greater than the shutoff trigger 114. In certain examples, the bypass switch 112 may be electrically connected is series with the flow switch 110. In accordance with certain examples, the bypass switch 112 may be electrically separated from the flow switch 110. In such examples the bypass switch 112 may be electrically connected by a bypass switch lead 130 to a controller 132, and the flow switch 110 may be independently connected to the controller 132 by isolation valve and/or the flow switch lead 134.

In certain examples the isolation valve 108 and the flow switch 110 may be connected to an internal signal harness 136. The internal signal harness 136 may be connected to an electrical connector 138, the internal signal harness 136 coupling the isolation valve 108 and the flow switch 110 to the electrical connector 138. The electrical connector 138 may be seated in a wall of the housing 102 and connected to an external signal harness 140, the electrical connector 138 coupling the internal signal harness 136 to the external signal harness 140. The external signal harness 140 may in turn connected to the controller 132, the isolation valve 108 and the flow switch 110 electrically connected to the controller 132 by the external signal harness 140 and the internal signal harness 136 through the electrical connector 138. The external signal harness 140 may include a plurality of leads, for example, the bypass switch lead 130 and the flow switch lead 134. As will be appreciated by those of skill in the art in view of the present disclosure, other connectivity arrangements are possible and remain within the scope of the present disclosure.

In certain examples, a solenoid 142 may be operatively connected to the isolation valve 108. In this respect the solenoid 142 may be operatively connected to valve member movable disposed within the isolation valve 108, such as diaphragm member, the solenoid 142 configured to open and closed the isolation valve 108 by displacing the valve member. The solenoid 142 may be arranged within the interior of the housing 102. The solenoid 142 may be a latching-type solenoid, the isolation valve 108 thereby remaining closed subsequent to closure and allowing the flow switch 110 to be arranged fluidly between the outlet conduit 106 and the isolation valve 108. In accordance with certain examples, the solenoid 142 may be electrically connected to a relay 144. The relay 144 may be arranged outside of the housing 102 and electrically connected to the solenoid 142 for energizing the solenoid 142. Electrical connection may be through the external signal harness 140 an the internal signal harness 136 through the electrical connector 138.

In the illustrate example the controller 132 includes a device interface 146, a processor 148, a user interface 150, and a memory 152. The device interface 146 couples the processor 148 to the bypass switch 112, the flow switch 110, and the isolation valve 108, and may be connected to the external signal harness 140. The processor 148 is connected to the device interface 146, is operably associated with the user interface 150 to provide user output and/or receive user input therethrough, and is disposed in communication with the memory 152. The memory 152 includes a non-transitory machine-readable medium having a plurality of program modules 154 recorded on the medium containing instructions that, when read by the processor 148, cause the processor 148 to execute certain operations. Among the operations are operations of a flow control method 300 (shown in FIG. 6), as will be described. In certain examples, the controller 132 may include a safety programmable logic (PLC) controller 156. Examples of suitable safety PLC devices include TwinSafe® safety PLC devices, available from the Beckhoff Automation GmbH & Co. KG of Verl, Germany. Although shown and described herein with a particular architecture, it is to be understood and appreciated that the controller 132 may have other architectures (e.g., distributed architectures) in other examples and remain within the scope of the present disclosure.

As shown in FIG. 2, when the bypass switch 112 is in the first position 116, the flow switch 110 is operably coupled to the isolation valve 108. In the illustrated example the flow switch 110 is operably coupled to the isolation valve 108, the isolation valve 108 remaining in the open position 122 while flow rate of fluid traversing the flow switch 110 is less than the shutoff trigger 114. As will be appreciated by those of skill in the art in view of the present disclosure, this allows the flow control arrangement 100 to provide the process fluid 26 to the semiconductor processing system 10 (shown in FIG. 1), the semiconductor processing system 10 thereby depositing the material layer 36 onto the substrate 38 using the process fluid 26 while flow rate of the process fluid 26 traversing the flow switch 110 is less than the shutoff trigger 114.

As shown in FIG. 3, the flow switch 110 may be operably coupled from the isolation valve 108 when the bypass switch 112 is in the first position 116 by the controller 132, the isolation valve 108 thereby moving to the closed position 124 when flow rate of fluid traversing the flow switch 110 is greater than the shutoff trigger 114. In the illustrated example the flow switch 110 provides the shutoff signal 128 to the controller 132. The controller 132, responsive to receipt of the shutoff signal 128, turn provides a closure signal 158 to the isolation valve 108. Responsive to receipt of the closure signal 158, the isolation valve 108 moves to the closed position 124, the isolation valve 108 thereby fluidly separating the outlet conduit 106 from the inlet conduit 104. As will be appreciated by those of skill in the art in view of the present disclosure, fluid separation of the outlet conduit 106 from the inlet conduit 104 ceases flow of the process fluid 26 to the semiconductor processing system 10 (shown in FIG. 1), preventing flow of the process fluid 26 to the semiconductor processing system 10 at rates greater than that which can be ventilated by the vent fluid 22 (shown in FIG. 1) and/or be inerted or adequately diluted by the inert/diluent fluid 34 (shown in FIG. 1), the flow control arrangement 100 thereby limiting (or eliminating) risk otherwise associated with potentially hazardous material entrained within the process fluid 26.

As shown in FIG. 4, the flow switch 110 may be operably decoupled from the isolation valve 108 when the bypass switch 112 is in the second position 118 by the controller 132, the isolation valve 108 thereby remaining in the open position 122 when flow rate of fluid traversing the flow switch 110 is greater than the shutoff trigger 114. In this respect it contemplated that the bypass switch 112 provide a bypass signal 160 (e.g., a jumper bit) an input to the controller 132 when moved to the second position 118, and that the controller 132 not provide the closure signal 158 (shown in FIG. 3) to the isolation valve 108 when in receipt of the bypass signal 160. As a consequence, the outlet conduit 106 remains fluidly coupled to the inlet conduit 104 when the bypass switch 112 is in the second position 118 and flow rate of fluid traversing the flow switch 110 is greater than and/or rises above the shutoff trigger 114, the fluid continuing to flow to the semiconductor processing system 10 (shown in FIG. 1) at a flow rate greater than the shutoff trigger 114.

As will be appreciated by those of skill in the art in view of the present disclosure, this allows the qualification/service fluid 44 to be provided to the semiconductor processing system 10 at flow rates greater than the shutoff trigger 114 without modification of fluid-conveying structure fluidly coupling the qualification/service fluid source 42 (shown in FIG. 1) and the process chamber 16 (shown in FIG. 1), facilitating qualification and/or service events requiring flow rates of qualification/service fluids greater than the shutoff trigger 114. In certain examples, the qualification/service fluid 44 may be provided to the semiconductor processing system 10 at a flow rate greater than shutoff trigger 114 and less than the flow rating 40 (shown in FIG. 1) of the flow control device 14 (shown in FIG. 1). In this respect the qualification/service fluid 44 may be provided to the semiconductor processing system 10 at a flow rate that is between about 110% and about 900% of the shutoff trigger 114, or between about 200% and about 900% of the shutoff trigger 114, or event between about 500% and about 900% of the shutoff trigger 114, without modification of fluid-conveying structure fluidly coupling the qualification/service fluid source 42 and the process chamber 16.

In certain examples, the controller 132 may provide a user output 162 through the user interface 150 when the bypass switch 112 is in the second position 118. As will be appreciated by those of skill in the art in view of the present disclosure, the user output 162 may facilitate operation of the semiconductor processing system 10, for example, by preventing scheduling of WIP to the semiconductor processing system 10 (shown in FIG. 1) coincident to qualification and/or service events on the semiconductor processing system 10.

In accordance with certain examples, the flow control arrangement 100 may include a lockout-tagout (LOTO) device 164. The LOTO device 164 may be configured for affixation to the bypass switch 112, for example, when the bypass switch 112 is in the second position 118. In this respect it is contemplated that the LOTO device 164 be affixed to the bypass switch 112 when the bypass switch 112 is in the second position 118, the LOTO device 164 fixing the bypass switch 112 in the second position 118. This allows prevents the bypass switch 112 form being moved to the first position 116, such as during qualification and/or service events during which the qualification/service fluid 44 is required, preventing interruption of such qualification and/or service events absent deliberate removal of the LOTO device 164.

With reference to FIG. 5, a flow control arrangement 200 is shown. The flow control arrangement 200 is similar to the flow control arrangement 100 (shown in FIG. 1) and includes at least one device configured to provide a diagnostic input 202 for assessing reliability of flow control arrangement 200. In this respect it is contemplated that the one or more diagnostic input 202 be provided to the controller 132, and that the controller 132 in turn determine reliability of the flow control arrangement 200 using the one or more diagnostic input. In certain examples, the flow control arrangement 200 may have a safety integrity level (SIL) rating, and the one or more diagnostic input 202 may contribute to the SIL rating of the flow control arrangement 200 by increasing reliability of the flow control arrangement 200. For example, the flow control arrangement 200 may have a SIL rating that is between 1 and 4, or between 2 and 4, or a SIL rating that is a 3 or even a 4.

In certain examples, the one or more diagnostic input 202 may be received from a gas detector 204 (shown in FIG. 1). The gas detector 204 may be connected to the controller 132 by a gas detector lead 206, and the controller 132 configured to close the isolation valve 108 when the diagnostic input 202 indicates that process gas has infiltrated the environment within the gas box 12 (shown in FIG. 1). In accordance with certain examples, the one or more diagnostic input 202 may be provided by a second flow switch 208. The second flow switch 208 may be configured to provide the diagnostic input 202 to the controller 132 when flow of fluid traversing the second flow switch 208 exceeds a second shutoff trigger. The controller 132 may be configured to close the isolation valve 108 when only one of the shutoff signal 128 (shown in FIG. 4) and the diagnostic input 202 is present. The controller 132 may further be configured to provide a user output to the user interface 150 under either of the aforementioned circumstances.

In certain examples, the diagnostic input 202 may be provided by a flow sensor 210. The flow sensor 210 may be coupled to the inlet conduit 104 by the isolation valve 108, connected to the controller by a flow sensor lead 212, and configured to provide a flow rate measurement of fluid traversing the flow switch 110 using the diagnostic input 202. The controller 132 may in turn be configured to the compare the flow rate measurement to the shutoff trigger 114 of the flow switch 110, determine whether the flow switch 110 should (or should not) be providing the shutoff signal 128 (shown in FIG. 4), and provide a user output to the user interface 150 when the controller 132 determines that a discrepancy exists. In accordance with certain examples, a second isolation valve 214 may be arranged within the housing 102 and fluidly in series with the flow switch 110. The controller 132 may be operably connected to the second isolation valve 214 and configured to close the second isolation valve 214 when the flow rate of fluid through the flow switch 110 is greater than the shutoff trigger 114.

In certain examples, the diagnostic input 202 may be provided by an inert/diluent fluid flow switch 216. The inert/diluent fluid flow switch 216 may be arranged outside of the housing 102. The inert/diluent fluid flow switch 216 may fluidly couple the inert/diluent fluid source 32 (shown in FIG. 1) to the exhaust source 28 (shown in FIG. 1). It is contemplated that the inert/diluent fluid flow switch 216 has an inert/diluent fluid shutoff trigger 218, that the inert/diluent fluid flow switch 216 provide the diagnostic input 202 to the controller via an inert/diluent fluid flow switch lead 220 when flow rate of the inert/diluent fluid traversing the inert/diluent fluid flow switch 216 is less than the inert/diluent fluid shutoff trigger 218, and that the controller 132 cause the isolation valve 108 to close responsive to receipt of the diagnostic input 202 (e.g., a diagnostic signal). It is also contemplated that the flow control arrangement 200 may further include a third inert/diluent flow switch 222 and/or an inert/diluent flow sensor 224 to provide a diagnostic signal verifying the aforementioned operation. In further examples, the diagnostic input 202 may be provided by a timing module 226, the timing module 226 configured to provide the diagnostic input 202 upon tolling of predetermined qualification/purge interval run upon movement of the bypass switch 112 to the second position 118, and the controller 132 in turn configured to close the isolation valve 108 upon receipt of the diagnostic signal once the predetermined qualification/purge interval has run.

With reference to FIGS. 6-9, the flow control method 300 is shown. As shown in FIG. the flow control method 300 includes moving a bypass switch, e.g., the bypass switch 112 (shown in FIG. 2), to a first position, e.g., the first position 116 (shown in FIG. 2), as shown with box 302. The flow control method also includes receiving a process fluid including a hazardous material, e.g., the process fluid 26 (shown in FIG. 1), at an inlet conduit of a flow control arrangement, e.g. the inlet conduit 104 (shown in FIG. 2) of the flow control arrangement 100 (shown in FIG. 1), as shown with box 304. In certain examples the hazardous material may include a hazardous process material, such as hydrogen ($H_2$) gas, as shown with box 306. In accordance with certain examples, the hazardous material may include a material layer precursor, as shown with box 308. For example, the process fluid may include silane or arsine. It is also contemplated that the hazardous material may include an etchant, as shown with box 310. In this respect the process fluid may include hydrochloric (HCl), chlorine ($Cl_2$), or a fluorine-containing material.

It is contemplated that movement of the bypass switch to the first position operably couple a flow switch of the flow control arrangement to an isolation valve of the flow control arrangement, e.g., operably couple the flow switch 110 (shown in FIG. 2) to the isolation valve 108 (shown in FIG. 2), as shown with box 312. Flow rate of the process fluid is compared to a shutoff trigger of the flow switch, e.g., the shutoff trigger 114 (shown in FIG. 2), as the process fluid traverses the flow switch, as shown with box 314. When the flow rate of the process fluid is less than the shutoff trigger of the flow switch the process fluid is flowed to an outlet conduit of the flow control arrangement, e.g., the outlet conduit 106 (shown in FIG. 2), as shown with box 316, box 318, and arrow 320. When the flow rate of the process fluid traversing the flow switch is greater than the shutoff trigger of the flow switch, the isolation valve is closed, and the outlet conduit is fluidly separated from the inlet conduit of the flow control arrangement, as shown with box 316, box 322, and arrow 324. As shown with arrow 326, it is contemplated that the flow rate of the process fluid be monitored by iteratively making the aforementioned comparison, fluid communication of the process fluid ceasing in the event that flow rate of the process fluid rises above the shutoff trigger of the flow switch. As shown with box 328, the comparison of the flow rate may be done in situ, for example, in real time with the fluid flow at the flow switch to monitor flow rate variation that the fluid flow may exhibit.

Figure 7:
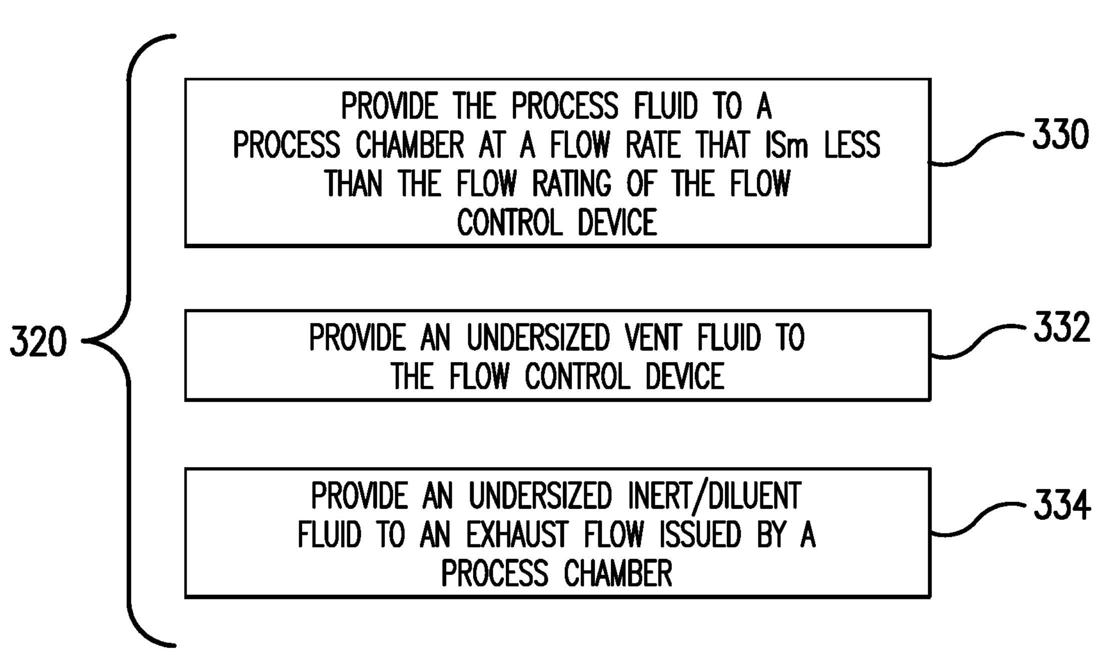

As shown in FIG. 7 with box 330, flowing 320 the process fluid may include providing the process fluid to a process chamber, e.g., the process chamber 16 (shown in FIG. 1). The process fluid may be provided to the process chamber at a flow rate that is less than a flow rating of a flow control device fluidly coupling the flow control arrangement to the process chamber, e.g. the flow rating 40 (shown in FIG. 1) of the flow control device 14 (shown in FIG. 1), as also shown with box 330. In certain examples, the shutoff trigger may be less than the flow rating of the flow control device, the flow control arrangement thereby operating as a virtual restrictive flow orifice device. As shown with box 332, an undersized flow of vent fluid, e.g., the vent fluid 22 (shown in FIG. 1), may be provided to the flow control device. As will be appreciated by those of skill in the art in view of the present disclosure, this may limit operating cost associated with provision of the vent fluid flow. As shown with box 334, an undersized inert/diluent fluid flow, e.g., the inert/diluent fluid 34 (shown in FIG. 1), may (alternatively or additionally) be provided to an exhaust fluid, e.g., the exhaust fluid 30 (shown in FIG. 1), issued by the process chamber. As will also appreciated by those of skill in the art in view of the present disclosure, this may limit cost associated with provision of the inert/diluent fluid to the exhaust fluid.

Figure 8:
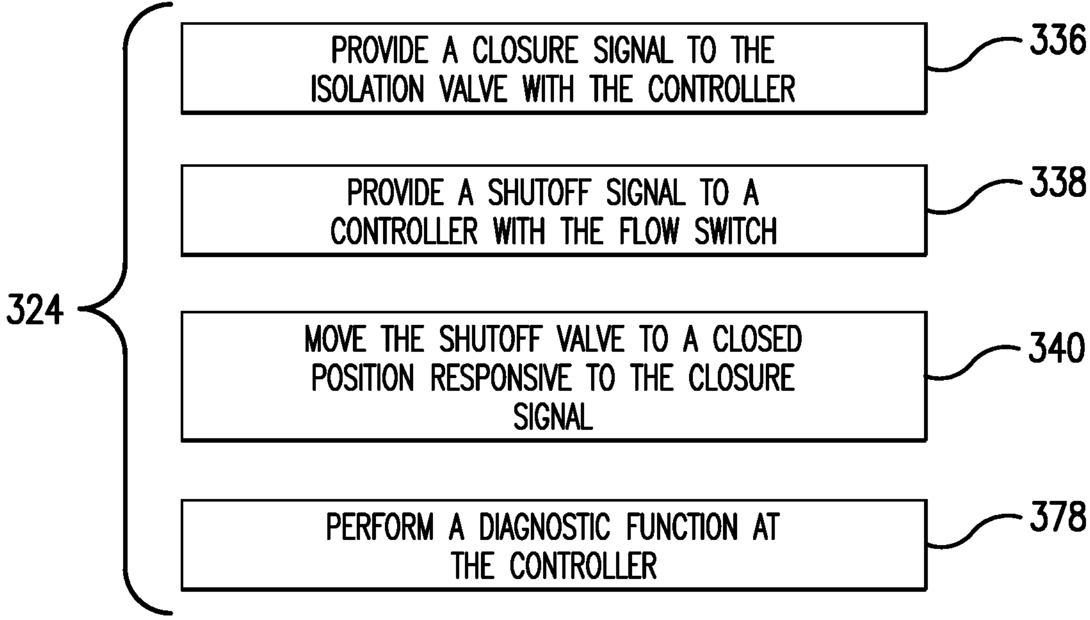

As shown in FIG. 8, closing 324 the isolation valve may be accomplished by providing a shutoff signal, e.g., the shutoff signal 128 (shown in FIG. 3), using the flow switch, as shown with box 336. The shutoff signal may be provided to a controller, e.g., the controller 132 (shown in FIG. 2), by the flow switch. Closure of the isolation valve may be accomplished by receiving a closure signal, e.g., the closure signal 158 (shown in FIG. 3), at the isolation valve, as shown with box 338. The closure signal may be provided by the controller. Responsive to receipt of the closure signal, the isolation valve may close, for example, by a moving a valve member supported for movement within the isolation valve from an open position to a closed position, e.g., from the open position 122 (shown in FIG. 2) to the closed position 124 (shown in FIG. 3), as shown with box 340. Movement may be accomplished, for example, by energizing a solenoid with a relay, e.g., energizing the solenoid 142 (shown in FIG. 2) with the relay 144 (shown in FIG. 2). Once in the closed position the solenoid may latch, the valve member thereby being retained in the closed position. A user output may be provided to a user interface, e.g., the user output 162 (shown in FIG. 4) provided to the user interface 150 (shown in FIG. 2).

Figure 9:
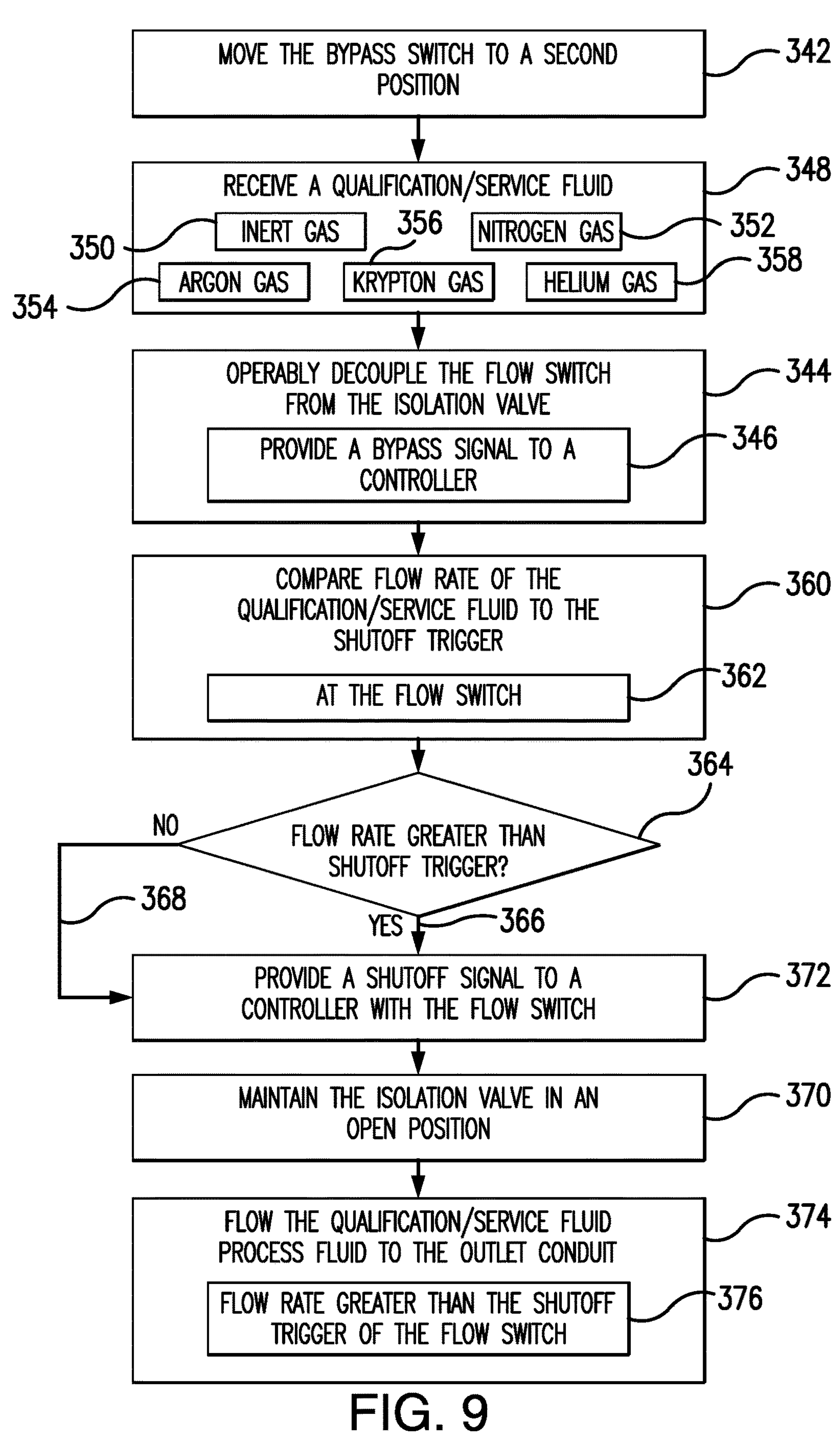

As shown in FIG. 9, the flow control method 300 further includes moving the bypass switch to a second position, e.g., the second position 118 (shown in FIG. 2), as shown with box 342. It is contemplated that movement of the bypass switch to the second position operably decouple the flow switch from the isolation valve, as shown with box 344, disabling the above-described virtual RFO device otherwise provided by the flow control arrangement. Operable decoupling may be accomplished by providing a bypass signal to the controller, e.g., the bypass signal 160 (shown in FIG. 4), as shown with box 346. Bypassing may be accomplished during a qualification or service event, for example, when a need exists to provide a qualification/purge fluid to the process chamber. In this respect it is contemplated that a qualification/service fluid, e.g. the qualification/service fluid 44, be received at the inlet conduit of the flow control arrangement, as shown with box 348. The qualification/service fluid may include an inert gas, as shown with box 350. For example, the qualification/service fluid may include (or consist of or consist essentially of) nitrogen ($N_2$) gas, as shown with box 352. In certain examples, the qualification/service fluid may include (or consist of or consist essentially of) argon (Ar) gas, as shown with box 354. In accordance with certain examples, the qualification/service fluid may include (or consist of or consist essentially of) krypton (Kr) gas or helium (He) gas, as shown with box 356 and box 358.

As shown with box 360, it is contemplated that flow rate of the qualification/service fluid may be compared to the shutoff trigger of the flow switch as the qualification/service fluid traverses the flow switch. As shown with box 362, the comparison may be accomplished in situ and at the flow switch. Notably, irrespective of whether flow rate of the qualification/service fluid is greater than the shutoff trigger or less than the shutoff trigger of the flow switch, the isolation valve is maintained in the open position, as shown with box 364, box 366, arrow 368, and arrow 370. In this respect it is contemplated that the flow switch provide the shutoff signal to the controller when the flow rate of the qualification fluid is greater than the shutoff trigger of the flow switch, and that the controller not provide the closure signal upon receipt of the shutoff signal when in receipt of the bypass signal, as shown with box 372. As shown with box 374, it is contemplated that the qualification/service fluid flow through the flow control arrangement to the process chamber, and that the qualification or service requiring the qualification/service fluid be conducted with the bypass switch in the second position. Advantageously, the qualification/service fluid may be provided to the process chamber at flow rates greater than the shutoff trigger when the bypass switch is in the second position, as shown with box 376, avoiding the need to replace an RFO device sized for the flow rate required for process fluid with a larger RFC device sized for the required flow rate of qualification/service fluid. In certain examples, a LOTO device, e.g., the LOTO device 164 (shown in FIG. 4), may be affixed to the bypass when in the second position to fix the bypass switch in the second position, the flow control method 300 thereby comporting with LOTO practice at the facility housing the flow control arrangement.

With continuing reference to FIG. 8, it is contemplated that the method 300 may further include performing one or more diagnostic function, e.g., using controller 132 (shown in FIG. 2) and/or the safety PLC device 156 (shown in FIG. 2), as shown with box 378. The diagnostic function may be performed using the diagnostic input 202 (shown in FIG. 5), and may provide the flow control arrangement with a higher SIL rating that otherwise possible. For example, the isolation valve may be closed when leakage of process fluid is detected or flow rate of the inert/diluent fluid is insufficient. Closure of the isolation valve may be monitored, and redundancy provided to one or more of the isolation valve and the flow switch. In certain examples, duration of a qualification or service event may be controlled.

Fluid systems, such as fluid systems arranged to provide process fluids containing hazardous materials to semiconductor processing systems, may require testing for contaminants likes particulates and moisture. Testing may require that a qualification/service fluid like an inert gas be provided to the fluid system at a flow rate greater than that permitted by flow control devices employed by the fluid system to limit flow of process fluids, such as restrictive flow orifice (RFO) devices, which ensure that vent fluid flows provided to gas boxes and inert/diluent flows provided to exhausts are adequate for safety purposes. As a consequence, qualification (for commissioning) and/or service (subsequent to commission) of the fluid system may require removal of the RFO device from the fluid system, such as to purge the fluid system to remove particulate and/or moisture contamination from the fluid system. The RFO device need thereafter be returned to the fluid system, which typically brings with it risk that contaminant and/or moisture be introduced into the fluid system subsequent to the qualification or service event during re-installation of the RFO device.

In examples described herein, a bypass switch is employed to limit (or avoid entirely) the need to remove and return restrictive flow devices, such as RFO devices, prior and subsequent to qualification and service events. The bypass switch may cooperate with a flow switch and isolation valve to form a virtual RFO device with a relatively small flow rating when the bypass switch is in a first position, and the bypass switch may cooperate with the flow switch and the isolation valve to allow fluid flow according to a relatively large flow rating of a flow control device arranged within the fluid system. As a consequence, qualification and/or service events requiring fluid flow rates greater than that of the virtual RFO device may be accomplished without the need to remove and thereafter return an RFO device sized to limit flow of process fluid through the fluid system. In accordance with certain examples, the bypass switch may cooperate with a LOTO device, the bypass switch thereby being readily integrated into established controls for such devices. It is also contemplated that the bypass switch may further cooperate with diagnostic features implemented on a safety PLC device, such as by providing indication through a user interface as to status and/or of failures relating to reliability, such as in the unlikely event that a contact within a switch sticks (or welds shut). Advantageously, the time required for qualification or service events typically requiring removal and return of an RFO device to the fluid system are shorter than otherwise possible.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises,” “comprising,” “includes,” and/or “including,” when used in this specification, specify the presence of stated features, integers, steps, operations, elements, and/or components, but do not preclude the presence or addition of one or more other features, integers, steps, operations, element components, and/or groups thereof. The term “about” is intended to include the degree of error associated with measurement of the particular quantity based upon the equipment available at the time of filing the application.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A flow control arrangement, comprising:

a housing seating an inlet conduit and an outlet conduit;

an isolation valve arranged within the housing and connected to the inlet conduit;

a flow switch arranged within the housing and coupling the isolation valve to the outlet conduit, the flow switch having a shutoff trigger; and a bypass switch with a first position and a second position coupled to the isolation valve, wherein the flow switch is operably coupled to the isolation valve when the bypass switch is in the first position to close the isolation valve when flow rate of a fluid through the flow switch is above the shutoff trigger, and wherein the flow switch is operably decoupled from the isolation valve when the bypass switch is in the second position to flow a fluid through the flow switch at a flow rate greater than the shutoff trigger.

2. The flow control arrangement of claim 1, wherein a flow path defined between the inlet conduit and the outlet conduit is contiguously welded.

3. The flow control arrangement of claim 1, wherein the housing includes a tamperproof body enclosing the isolation valve, the flow switch, at least a portion of the inlet conduit, and at least a portion of the outlet conduit.

4. The flow control arrangement of claim 1, further comprising:

an electrical connector seated in a wall of the housing;

an internal signal harness arranged within the housing and electrically connected to the isolation valve and the flow switch; and an external signal harness arranged outside of the housing and electrically connected to the internal signal harness by the electrical connector.

5. The flow control arrangement of claim 1, further comprising:

a solenoid arranged within the housing and operatively connected to the isolation valve;

a relay arranged outside of the housing and electrically connected to the solenoid to energize the solenoid; and a safety programmable logic controller (PLC) device arranged outside of the housing and coupled to the relay, the safety PLC device communicative with a user interface to provide a user output based on open and closure of the relay.

6. The flow control arrangement of claim 1, further comprising a controller coupling the flow switch to the isolation valve.

7. The flow control arrangement of claim 6, wherein the controller is responsive to instructions recorded on a memory to:

receive bypass signal from the bypass switch indicating that the bypass switch is in the first position;

receive a shutoff signal from the flow switch; and provide a closure signal to the isolation valve in response to receipt of the shutoff signal from the flow switch.

8. The flow control arrangement of claim 7, wherein the instructions recorded on the memory further cause the controller to:

receive bypass signal from the bypass switch indicating that the bypass switch is in the second position;

receive a shutoff signal from the flow switch; and provide no closure signal to the isolation valve in response to receipt of the shutoff signal from the flow switch.

9. The flow control arrangement of claim 6, wherein the controller includes a safety programmable logic controller device further comprising a bypass lead electrically connecting the bypass switch to the controller.

10. The flow control arrangement of claim 1, further comprising a lockout-tagout device affixed to the bypass switch and fixing the bypass switch in the first position.

11. A semiconductor processing system, comprising:

a process fluid source including a hazardous process material;

a flow control arrangement as recited in claim 1, wherein the process fluid source is fluidly coupled to the inlet conduit;

a flow control device with a flow rating coupled to the outlet conduit; and a process chamber with a substrate support fluidly coupled to the flow control device and therethrough to the process fluid source, wherein the flow rating of the flow control device is less than the shutoff trigger of the flow switch.

12. The semiconductor processing system of claim 11, further comprising a qualification/service fluid source coupled to the process chamber by the flow control arrangement, wherein the qualification/service fluid source includes a qualification/service fluid consisting essentially of nitrogen gas.

13. The semiconductor processing system of claim 11, further comprising:

a gas box housing the flow control device;

a vent source fluidly coupled to the gas box, wherein the vent source is matched to the shutoff trigger of the flow switch and is undersized relative to the flow rating of the flow control device;

an exhaust source fluidly coupled to the process chamber; and an inert/diluent fluid source fluidly coupled to the exhaust source, wherein the inert/diluent fluid source is matched to the shutoff trigger of the flow switch and is undersized relative to the flow rating of the flow control device.

14. A flow control method, comprising:

at a flow control arrangement including a housing seating an inlet conduit and an outlet conduit, an isolation valve arranged in the housing and connected to the inlet conduit, a flow switch with a shutoff trigger arranged in the housing and coupling the isolation valve to the outlet conduit, and a bypass switch having first and second positions coupled to the isolation valve, moving the bypass switch to the first position or the second position;

operably coupling the flow switch to the isolation valve when the bypass switch is in the first position;

operably decoupling the flow switch from the isolation valve when the bypass switch is in the second position;

whereby the isolation valve is closed when flow rate of a fluid traversing the flow switch is greater than the shutoff trigger while the bypass switch is in the first position; and whereby the isolation valve remains open when flow rate of a fluid traversing the flow switch is less that the shutoff trigger while the bypass switch is in the second position.

15. The flow control method of claim 14, wherein moving the bypass switch comprises moving the bypass switch to the first position, the method further comprising:

receiving a process fluid including a hazardous material at the inlet conduit;

flowing the process fluid to the outlet conduit through the isolation valve and the flow switch;

comparing flow rate of the process fluid to the shutoff trigger at the flow switch;

providing a shutoff signal with the flow switch when the flow rate is greater than the shutoff trigger; and receiving a closure signal at the isolation valve responsive to provision of the shutoff signal by the flow switch.

16. The flow control method of claim 14, wherein moving the bypass switch comprises moving the bypass switch to the first position, the method further comprising:

receiving a process fluid including a hazardous material at the inlet conduit;

flowing the process fluid to the outlet conduit through the isolation valve and the flow switch;

comparing flow rate of the process fluid to the shutoff trigger at the flow switch; and providing no shutoff signal with the flow switch when the flow rate of the process fluid is less than the shutoff trigger of the flow switch.

17. The flow control method of claim 16, wherein the bypass switch is in the first position, the method further comprising flowing the process fluid to a process chamber fluidly coupled to the outlet conduit by a flow control device having a flow rating, the flow rating greater than the shutoff trigger of the flow switch.

18. The flow control method of claim 14, wherein moving the bypass switch comprises moving the bypass switch to the second position, the method further comprising:

receiving a process fluid including a hazardous material at the inlet conduit;

flowing the process fluid to the outlet conduit through the isolation valve and the flow switch;

comparing flow rate of the process fluid to the shutoff trigger at the flow switch;

providing a shutoff signal with the flow switch when the flow rate of the process fluid is greater than the shutoff trigger of the flow switch; and receiving a closure signal at the isolation valve responsive to provision of the shutoff signal by the flow switch.

19. The flow control method of claim 14, further comprising:

affixing a lockout-tagout device to the bypass switch; and fixing the bypass switch in the second position with the lockout-tagout device.

20. The flow control method of claim 14, wherein moving the bypass switch comprises moving the bypass switch to the second position, the method further comprising:

receiving a qualification/service fluid at the inlet conduit;

flowing the qualification/service fluid to the outlet conduit through the isolation valve and the flow switch;

comparing flow rate of the qualification/service fluid to the shutoff trigger at the flow switch;

providing no shutoff signal with the flow switch when the flow rate of the qualification/service fluid is less than the shutoff trigger of the flow switch; and wherein the qualification/service fluid is flowed to a process chamber coupled to the outlet conduit at a flow rating of a flow control device coupling the outlet conduit to the process chamber.

* * * * *